(12) United States Patent
Cho et al.

(10) Patent No.: US 12,142,388 B2
(45) Date of Patent: Nov. 12, 2024

(54) METHOD FOR SOLIDIFYING RADIOACTIVE WASTE

(71) Applicants: Nam-Chan Cho, Daejeon (KR); Young-Jong Ju, Daejeon (KR); Jeong-Myeong Kim, Daejeon (KR); Dong Han Lim, Yongin-si (KR); Kyoung Kuk Ki, Hwaseong-si (KR); Jung Hoon Park, Hwaseong-si (KR)

(72) Inventors: Nam-Chan Cho, Daejeon (KR); Young-Jong Ju, Daejeon (KR); Jeong-Myeong Kim, Daejeon (KR); Dong Han Lim, Yongin-si (KR); Kyoung Kuk Ki, Hwaseong-si (KR); Jung Hoon Park, Hwaseong-si (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 558 days.

(21) Appl. No.: 17/517,094

(22) Filed: Nov. 2, 2021

(65) Prior Publication Data

US 2022/0059249 A1 Feb. 24, 2022

Related U.S. Application Data

(60) Division of application No. 16/035,011, filed on Jul. 13, 2018, now Pat. No. 11,200,995, which is a continuation of application No. PCT/KR2016/006449, filed on Jun. 17, 2016.

(30) Foreign Application Priority Data

Jan. 13, 2016 (KR) .................. 10-2016-0004345

(51) Int. Cl.
| | |
|---|---|
| *G21F 9/16* | (2006.01) |
| *C04B 14/36* | (2006.01) |
| *C04B 28/06* | (2006.01) |
| *G21F 9/34* | (2006.01) |
| *C04B 22/14* | (2006.01) |

(52) U.S. Cl.
CPC .............. *G21F 9/165* (2013.01); *C04B 14/36* (2013.01); *C04B 28/06* (2013.01); *G21F 9/16* (2013.01); *G21F 9/34* (2013.01); *C04B 22/143* (2013.01)

(58) Field of Classification Search
CPC ... G21F 9/16; G21F 9/165; G21F 9/34; C04B 14/36; C04B 28/06; C04B 22/143
USPC ............................................................. 588/4
See application file for complete search history.

(56) References Cited

U.S. PATENT DOCUMENTS

| | | | |
|---|---|---|---|
| 2010/0229769 | A1 | 9/2010 | Shirasaki et al. |
| 2011/0177933 | A1 | 7/2011 | Valentini et al. |

FOREIGN PATENT DOCUMENTS

| | | | |
|---|---|---|---|
| JP | S62-502401 | A | 8/1987 |
| JP | S63-121799 | A | 5/1988 |
| JP | S63-289498 | A | 11/1988 |
| JP | H01-191098 | A | 8/1989 |
| JP | 07-104438 | B2 | 11/1995 |
| JP | 2001-099990 | A | 4/2001 |
| JP | 2005-330394 | A | 12/2005 |
| JP | 2007-076946 | A | 3/2007 |
| JP | 2009-294017 | A | 12/2009 |
| JP | 5100570 | B2 | 12/2012 |
| JP | 2013-007599 | A | 1/2013 |
| KR | 10-2009-0089757 | A | 8/2009 |
| WO | WO 86/04889 | A1 | 8/1986 |

OTHER PUBLICATIONS

Improvement of the reliability of the technology concerning the countermeasures of Iodine 129, technical research, etc. of Business TRU waste disposal, etc. of 2014 University, Japan, Promotion of Nuclear environment development, financial management center, Mar. 2015, pp. 1-48.

*Primary Examiner* — Edward M Johnson
(74) *Attorney, Agent, or Firm* — Reinhart Boerner Van Deuren P.C.

(57) ABSTRACT

This invention relates to a solidifying agent for solidifying radioactive waste, and more particularly to a solidifying-agent composition for solidifying radioactive waste, including alumina cement and a gypsum powder. The solidifying-agent composition including alumina cement and a gypsum powder is capable of effectively minimizing an increase in the volume of a solidified radioactive waste product to a level satisfying physical and chemical safety regulations upon the solidification of radioactive waste.

5 Claims, No Drawings

METHOD FOR SOLIDIFYING RADIOACTIVE WASTE

CROSS-REFERENCE TO RELATED PATENT APPLICATIONS

This patent application is a divisional of U.S. patent application Ser. No. 16/035,011, filed Jul. 13, 2018, which is a continuation of PCT Application No PCT/KR2016/006449, filed Jun. 17, 2016, which claims priority to Korean Patent Application No. 10-2016-0004345, filed Jan. 13, 2016, the entire teachings and disclosure of which are incorporated herein by reference thereto.

TECHNICAL FIELD

The present invention relates to a solidifying agent for solidifying radioactive waste, and more particularly to a solidifying-agent composition for solidifying and thus physically and chemically stably treating radioactive waste generated from nuclear power plants and radioactive-material-handling places, and a method of preparing the same.

BACKGROUND

As conventional techniques for solidifying radioactive waste, a solidifying-agent composition comprising ordinary Portland cement and admixtures such as a polymer, paraffin, and the like, which are mixed together, is disclosed, but is not actually used.

The cost of storing and managing solidified radioactive waste products amounts to at least ₩ 10 million (Korean won) for 200 L of radioactive waste.

In the case where radioactive waste is solidified using a conventional ordinary-Portland-cement-based solidifying-agent composition, it is recommended that the solidifying agent be used 100% (5:5 ratio) relative to the mass of radioactive waste to be solidified in order to satisfy physical and chemical safety requirements. As such, the increase in the volume of the radioactive waste is considered to be 50% or more.

Currently, many attempts to treat radioactive waste using a solidifying agent are merely made to satisfy only physical and chemical safety, and are limited in that an increase in the volume during the solidification process is not considered. In particular, the amount of domestic radioactive waste that has not been solidified to date is considerable, and taking into account the treatment costs for radioactive waste that will continue to be generated in the future, the development of technology for reducing the volume of the solidified radioactive waste product is urgently required.

Korean Patent Application Publication No. 10-2009-0089757 discloses a solidifying agent composition and a method for solidifying fluent waste using same.

BRIEF SUMMARY

Embodiments of the present invention are intended to provide a solidifying-agent composition including alumina cement and a gypsum powder, thereby solidifying radioactive waste in a physically and chemically safe manner.

Therefore, an aspect of the present invention provides a solidifying-agent composition for solidifying radioactive waste, including alumina cement and a gypsum powder.

The solidifying-agent composition may include, of the total of 100 parts by weight of the composition, 10 to 70 parts by weight of alumina cement and 5 to 50 parts by weight of a gypsum powder, and may further include, of the total of 100 parts by weight of the composition, 1 to 10 parts by weight of a resin powder, 0.01 to 3 parts by weight of a reaction accelerator, 0.01 to 5 parts by weight of a retention agent, 0.01 to 5 parts by weight of a defoaming agent, and 0.1 to 10 parts by weight of a fluidizing agent.

In addition, another aspect of the present invention provides a method of solidifying radioactive waste, comprising the steps of (1) adding a fluidizing agent and water to radioactive waste and performing stirring, (2) adding a solidifying-agent composition to the radioactive waste containing the fluidizing agent and the water added in the step (1) and performing stirring, and (3) curing the radioactive waste containing the solidifying-agent composition added in the step (2).

In the step (2), the solidifying-agent composition may be added 33 to 68 parts by weight of 100 parts by weight of the radioactive waste, and may include alumina cement and a gypsum powder. The solidifying-agent composition may include, of 100 parts by weight thereof, 10 to 70 parts by weight of alumina cement and 5 to 50 parts by weight of a gypsum powder, and may further include, of the total of 100 parts by weight of the composition, 1 to 10 parts by weight of a resin powder, 0.01 to 3 parts by weight of a reaction accelerator, 0.01 to 5 parts by weight of a retention agent, 0.01 to 5 parts by weight of a defoaming agent, and 0.1 to 10 parts by weight of a fluidizing agent.

In the step (3), the curing may be performed for 28 days.

According to the present invention, a solidifying-agent composition includes alumina cement and a gypsum powder, and thus, during the solidification of radioactive waste, an increase in volume of the solidified radioactive waste product can be effectively minimized to a level satisfying physical and chemical safety regulations.

Also, the use of the solidifying agent, which is necessary for manufacturing a solidified radioactive waste product satisfying the radioactive waste treatment standard proposed by the Nuclear Environment Authority, can be effectively reduced by a maximum of 67%.

DETAILED DESCRIPTION

Hereinafter, a detailed description will be given of the present invention.

An embodiment of the present invention addresses a solidifying-agent composition for solidifying radioactive waste, including alumina cement and a gypsum powder. The solidifying-agent composition may include, of the total of 100 parts by weight thereof, 10 to 70 parts by weight of alumina cement and 5 to 50 parts by weight of a gypsum powder, and may further include, of the total of 100 parts by weight thereof, 1 to 10 parts by weight of a resin powder, 0.01 to 3 parts by weight of a reaction accelerator, 0.01 to 5 parts by weight of a retention agent, 0.01 to 5 parts by weight of a defoaming agent, and 0.1 to 10 parts by weight of a fluidizing agent. If the amount of alumina cement is less than 10 parts by weight, the curing reaction (solidification reaction) of the solidifying agent is delayed and the compressive strength of the solidified product is not exhibited to a certain level. On the other hand, if the amount of alumina cement exceeds 70 parts by weight, the curing reaction of the solidifying agent occurs too rapidly, making it difficult to ensure pot life, and problems such as hydration heat generation, surface cracking, and low strength occur. The gypsum powder functions to realize strong bonding of alumina cement and waste, and the amount of gypsum powder is preferably 50% of the amount of alumina cement (50 parts by weight relative to 100 parts by weight of alumina cement) in order to exhibit desired strength. The resin powder improves the overall quality by increasing the chemical resistance and water resistance of the solidifying-agent composition. The retention agent regulates the curing time and is excellent in controlling the curing rate of alumina cement in the present invention. The defoaming agent removes foam from inside the solidifying-agent composition, and the fluidizing agent imparts fluidity to facilitate the mixing process, thus ensuring fluidity and attaining the homogeneity of radiative waste to be solidified.

Another embodiment of the present invention addresses a method of solidifying radioactive waste, comprising the steps of: (1) adding a fluidizing agent and water to radioactive waste and performing stirring; (2) adding a solidifying-agent composition to the radioactive waste containing the fluidizing agent and the water added in the step (1) and performing stirring; and (3) curing the radioactive waste containing the solidifying-agent composition added in the step (2).

The step (1) is performed to ensure the fluidity of the radioactive waste and to attain homogeneity of the radioactive waste to be solidified. When homogeneity is attained, the total radioactivity of the radioactive waste may be determined through a sampling process. If the radioactive waste has high viscosity or high hardness, it may be difficult to mix with a solidifying agent, and in the case where the solidifying agent and the radioactive waste are mixed poorly, the quality of the solidified product may deteriorate. Hence, the radioactive waste is added with water and a fluidizing agent to obtain a certain fluidity, after which the solidifying agent may be mixed, thereby yielding a homogeneous solidified product.

In the step (2), the solidifying-agent composition is added 33 to 68 parts by weight of 100 parts by weight of the radioactive waste. If the amount of the solidifying-agent composition is less than 33 parts by weight, the compressive strength of the solidified product is not exhibited to a certain level. On the other hand, if the amount thereof exceeds 68 parts by weight, the amount of solidifying agent used for the waste is increased and the volume of the solidified waste product is increased to thus raise the costs of radioactive waste treatment. The solidifying-agent composition includes alumina cement and a gypsum powder, and the solidifying-agent composition may include, of 100 parts by weight thereof, 10 to 70 parts by weight of alumina cement and 5 to 50 parts by weight of a gypsum powder, and may further include, of the total of 100 parts by weight thereof, 1 to 10 parts by weight of a resin powder, 0.01 to 3 parts by weight of a reaction accelerator, 0.01 to 5 parts by weight of a retention agent, 0.01 to 5 parts by weight of a defoaming agent, and 0.1 to 10 parts by weight of a fluidizing agent.

In the step (3), the curing is preferably performed for 28 days in a sealed state. When the top of the waste is sealed and curing is performed, water evaporation is prevented, thereby reducing cracking of the solidified product and enhancing the compressive strength thereof, thereby making it possible to manufacture a solidified product that is more stable, both physically and chemically.

A better understanding of the present invention will be given of the following examples, which are merely set forth to illustrate but are not to be construed as limiting the scope of the present invention, as will be apparent to those skilled in the art.

Example 1. Preparation of Solidifying-Agent Composition

A solidifying-agent composition was prepared by mixing 60 g of alumina cement, 30 g of a gypsum powder, 3 g of a resin powder, 0.2 g of a reaction accelerator, 1 g of a retention agent, 2 g of a defoaming agent, and 3.5 g of a fluidizing agent.

Example 2. Preparation of Solidifying-Agent Composition

A solidifying-agent composition was prepared in the same manner as in Example 1, with the exception that 0.5 g of a reaction accelerator, 0.5 g of a retention agent, and 4 g of a fluidizing agent were used.

TABLE 1

[Table 1] Components (Weight) of solidifying-agent compositions of Examples 1 and 2

|  | Example 1 | Example 2 |
|---|---|---|
| Alumina cement | 60 g | 60 g |
| Gypsum powder | 30 g | 30 g |
| Resin powder | 3 g | 3 g |
| Reaction accelerator | 0.2 g | 0.5 g |
| Retention agent | 1 g | 0.5 g |
| Defoaming agent | 2 g | 2 g |
| Fluidizing agent | 3.5 g | 4 g |
| Total | 100 g | 100 g |

Example 3. Solidification of Radioactive Waste 100 g of radioactive waste (A) slurry containing 35% water (volume: 63 mL, solid content: 65 g) was subjected to solidification pretreatment through mixing with 5 g of a liquid fluidizing agent and stirring for 5 min. Thereafter, 33 g of the solidifying-agent composition prepared in Example 1 was added thereto and stirred for 3 min, after which a test specimen was manufactured using a mold for specimen production having a diameter of 50 mm and a height of 100 mm.

Example 4. Solidification of Radioactive Waste

The same procedures as in Example 3 were performed, with the exception that 43 g of the solidifying-agent composition prepared in Example 1 was used.

Example 5. Solidification of Radioactive Waste 100 g of radioactive waste (B) containing no water (volume: 136 mL, solid content: 100 g) was subjected to solidification pretreatment through mixing with 6 g of a liquid fluidizing agent and 55 g of mixing water and stirring for 5 min. Thereafter, 53 g of the solidifying-agent composition prepared in Example 2 was added thereto and stirred for 3 min, after which a test specimen was manufactured using a mold for specimen production having a diameter of 50 mm and a height of 100 mm.

Example 6. Solidification of Radioactive Waste

The same procedures as in Example 5 were performed, with the exception that 68 g of the solidifying-agent composition prepared in Example 2 was used.

Comparative Example 1

100 g of radioactive waste (A) slurry containing 35% water (volume: 63 mL, solid content: 65 g) was subjected to solidification pretreatment through mixing with 5 g of a liquid fluidizing agent and 38 g of mixing water and stirring. Thereafter, 100 g of a typical solidifying agent was added thereto and stirred, after which a test specimen was manufactured using a mold for specimen production having a diameter of 50 mm and a height of 100 mm.

Comparative Example 2

The same procedures as in Comparative Example 1 were performed, with the exception that 33 g of a typical solidifying agent was used.

Comparative Example 3

100 g of radioactive waste (B) containing no water (volume: 136 mL, solid content: 100 g) was subjected to solidification pretreatment through mixing with 5 g of a liquid fluidizing agent and 88 g of mixing water and stirring. Thereafter, 100 g of a typical solidifying agent was added thereto and stirred, after which a test specimen was manufactured using a mold for specimen production having a diameter of 50 mm and a height of 100 mm.

Comparative Example 4

The same procedures as in Comparative Example 3 were performed, with the exception that 55 g of mixing water and 53 g of a typical solidifying agent were used.

TABLE 2

Mixing conditions for solidifying radioactive waste according to the present invention

| | Waste | | | Solidification pretreatment | | Actual | Solidifying agent | | |
| | A (Slurry, water 35%) (g) | B (Dry, water 0%) (g) | Solid content (g) | Liquid fluidizing agent (g) | Mixing water (g) | water content (Calculated) (g) | Example 1 (g) | Example 2 (g) | Typical solidifying agent (OPC) (g) |
|---|---|---|---|---|---|---|---|---|---|
| Ex. 3 | 100 | | 65 | 5 | | 38 | 33 | | |
| Ex. 4 | 100 | | 65 | 5 | | 38 | 43 | | |
| Ex. 5 | | 100 | 100 | 6 | 55 | 58 | | 53 | |
| Ex. 6 | | 100 | 100 | 6 | 55 | 58 | | 68 | |
| Comp. Ex. 1 | 100 | | 65 | 5 | 38 | 76 | | | 100 |
| Comp. Ex. 2 | 100 | | 65 | 5 | 0 | 38 | | | 33 |
| Comp. Ex. 3 | | 100 | 100 | 6 | 88 | 91 | | | 100 |
| Comp. Ex. 4 | | 100 | 100 | 6 | 55 | 58 | | | 53 |

Measurement.

The solidified radioactive waste products obtained through solidification in Examples 3 to 6 and Comparative Examples 1 to 4 were measured for volume and for compressive strength through sealing and wet curing for 28 days. Furthermore, compressive strength was measured after an immersion test for 90 days of air drying and immersion, and compressive strength was measured after a heat cycle test (60 to −40° C., 30 cycles). The results are summarized in Table 3 below.

TABLE 3

| Test results | Volume of 100 g radioactive waste (mL) | Volume of mixture of 100 g waste and solidifying agent (mL) | Volume change (%) | Sealing, wet curing, 28 days Compressive strength (MPa) | Immersion test Air drying 90 days Compressive strength (MPa) | Immersion test Immersion 90 days Compressive strength (MPa) | Heat cycle test 60 to −40° C. Temperature change Compressive strength (MPa) |
|---|---|---|---|---|---|---|---|
| Ex. 3 | 63 | 76 | 20.6 | 14.6 | 16.5 | 17.8 | 18.8 |
| Ex. 4 | 63 | 80 | 27.0 | 17.8 | 19.2 | 20.5 | 20.8 |
| Ex. 5 | 136 | 123 | −9.6 | 13.5 | 14 | 14.5 | 15.6 |
| Ex. 6 | 136 | 132 | −2.9 | 16 | 17.5 | 17.7 | 18.5 |
| Comp. Ex. 1 | 63 | 118 | 87.3 | 15 | 16.8 | 18.8 | 19.5 |

TABLE 3-continued

| Test results | Volume of 100 g radioactive waste (mL) | Volume of mixture of 100 g waste and solidifying agent (mL) | Volume change (%) | Sealing, wet curing, 28 days Compressive strength (MPa) | Immersion test Air drying 90 days Compressive strength (MPa) | Immersion test Immersion 90 days Compressive strength (MPa) | Heat cycle test 60 to −40° C. Temperature change Compressive strength (MPa) |
|---|---|---|---|---|---|---|---|
| Comp. Ex. 2 | 63 | 88 | 39.7 | 2.8 | 1.7 | 3 | 3.2 |
| Comp. Ex. 3 | 136 | 150 | 10.3 | 14 | 15 | 15.5 | 16 |
| Comp. Ex. 4 | 136 | 130 | −4.4 | 2.6 | 2.3 | 3.6 | 3.2 |

TABLE 4

[Table 4] Radioactive waste solidification standards

| Items | Related standards | Test standards |
|---|---|---|
| Compressive strength | Hard solidified product 3.44 MPa (500 psig) or more | KS F2405 |
| | Soft solidified product 0.41 MPa (60 psig) when vertical strain of specimen is 3% | KS F2351 |
| Radioactive irradiation | Ion exchange resin 1.0E+6Gy | NRC ⌈Technical Position on Waste Form, Rev. 1⌋ |
| | Others 1.0E+7Gy | |
| Immersion test | Satisfying compressive strength standard after a minimum of 90 days | |
| Heat cycle test | Satisfying compressive strength standard after heat cycle test | ASTM B553 |
| Leaching test | Leaching index of 6 or more for Cs, Sr, Co nuclear species | ANS 16.1 |

As is apparent from Tables 2 to 4, upon the solidification of radioactive waste in order to satisfy the radioactive waste solidification standards (Table 4), of 100 parts by weight of the radioactive waste, the typical solidifying agent was used 100 parts by weight, and the solidifying-agent composition of the present invention was used 33 to 68 parts by weight, and all of Examples 3 to 6 satisfied radioactive waste treatment standards. Thus, in the solidified radioactive waste product according to the present invention, the use of the solidifying agent is reduced by a maximum of 67% compared to when using ordinary Portland cement (typical solidifying agent), whereby the volume of the resulting solidified product can be remarkably decreased.

Moreover, the volume change is 10.3 to 87.3% upon the use of the typical solidifying agent, but is −9.6 to 27% upon the use of the solidifying-agent composition according to an embodiment of the present invention.

Although the preferred embodiments of the present invention have been disclosed for illustrative purposes, those skilled in the art will appreciate that these embodiments are merely set forth to illustrate but are not to be construed to limit the scope of the present invention. Therefore, the substantial scope of the present invention will be defined by the appended claims and their equivalents.

The invention claimed is:

1. A method of solidifying radioactive waste, comprising the steps of:
   (1) adding a fluidizing agent and water to radioactive waste and performing stirring;
   (2) adding a solidifying-agent composition comprising alumina cement, and a gypsum powder, and a defoaming agent to the radioactive waste containing the fluidizing agent and the water added in the step (1) and performing stirring; and
   (3) curing the radioactive waste containing the solidifying-agent composition added in the step (2).

2. The method of claim 1, wherein in the step (2), the solidifying-agent composition is added 33 to 68 parts by weight of 100 parts by weight of the radioactive waste.

3. The method of claim 1, wherein the alumina cement is contained 10 to 70 parts by weight of 100 parts by weight of the composition, and the gypsum powder is contained 5 to 50 parts by weight of 100 parts by weight of the composition.

4. The method of claim 3, wherein the composition further comprises, of the total of 100 parts by weight thereof, 1 to 10 parts by weight of a resin powder, 0.01 to 3 parts by weight of a reaction accelerator, 0.01 to 5 parts by weight of a retention agent, 0.01 to 5 parts by weight of the defoaming agent, and 0.1 to 10 parts by weight of a fluidizing agent.

5. The method of claim 1, wherein the curing in the step (3) is performed for 28 days.

* * * * *